Feb. 13, 1951 O. C. KOPPEN 2,541,704
HIGH-LIFT AIRPLANE
Filed Sept. 2, 1949

INVENTOR
Otto C. Koppen

Patented Feb. 13, 1951

2,541,704

UNITED STATES PATENT OFFICE 2,541,704

HIGH-LIFT AIRPLANE

Otto C. Koppen, Wellesley, Mass., assignor to Helio Aircraft Corporation, Canton, Mass., a corporation of Delaware Application September 2, 1949, Serial No. 113,704

6 Claims. (Cl. 244—13)

This invention relates to fixed-wing aircraft for small-field use, and is particularly adapted to military liaison and rescue operations.

The utility of present-day fixed-wing aircraft for military as well as civil use is very much limited by the fact that they must use relatively large airports that are generally located at considerable distances from points between which transportation is actually desired. Since the ideal of personal transportation is a door-to-door vehicle, the closer the airplane approaches this ideal the more utility it will have in every-day transportation.

The chief reasons for the lack of accessible landing strips are the lack of availability and the cost of the size of landing strips required. Even a very light present-day airplane requires a strip of 1500 feet between 50 ft. obstructions and a smooth surface at least 1000 feet long by 50 feet wide. The purpose of this invention is to provide a practical single-propeller fixed-wing airplane that will be capable of using much shorter strips, say a strip of but 400–600 feet between 50 ft. obstructions, with a relatively smooth or prepared surface of 200 feet by 50 feet centrally of the length of said strip.

As a practical matter, in order to be able to use such a surface but 200 feet long, the proposed airplane in taking off must be capable of accelerating to its take-off speed (and, in landing, decelerating from its touch-down speed) in about one-half of that distance. That this landing performance is possible with the use of slots and flaps was demonstrated long ago in the Guggenheim Safe Airplane Competition of 1930 wherein both the Curtiss and the Handley-Page entries stopped in less than 100 feet after touch-down. However, in still air, a touch-down speed of less than 35 miles per hour is required in any case to allow the ordinary pilot to judge the landing accurately. At the present-day common landing speed of 50 miles per hour, a plus error in timing of only 2.6 seconds may cause the pilot to overshoot entirely the 200 ft. surface. During an approach to a landing, a pilot must make continuous estimates and then adjustments of the sinking speed and, since the accuracy with which he makes adjustments varies in proportion to his distance from the landing spot, the more time that is available, i. e., the lower the speed, the more accurate will be his approach. Therefore, both for the approach and landing run accuracy, a low speed is greatly desired, since these two factors in the aggregate fix the length of landing strip required.

The means of obtaining low landing speed are old in the art. With leading edge slots and slotted flaps, maximum lift coefficients from 2.5 to 3.2 (NACA Absolute Units) can be obtained and provide the low landing speed. The value of the coefficient depends on the proportion of the wing span covered by the high-lift devices and the particular type of high-lift device employed. (Lift coefficient is defined as, $$C_L = \frac{\text{lift}}{\text{wing area} \times \frac{1}{2} \text{ air density} \times \text{speed squared}})$$

With wing boundary layer control, even higher lift coefficients appear possible, but a considerable amount of additional development work is required before practical application of this means of increasing the lift coefficient can be made.

Despite the old inventions and use of high-lift devices, and prior aircraft capable of flying below a speed of 35 miles per hour even without the use of a high-lift device, the practical art has not provided a satisfactory fixed-wing aircraft for small-field use because, though a low landing speed was secured, a low take-off speed was unknown. Even to achieve such landing performance with a plain wing, a wing loading of less than 5 lbs. per square foot is required. The amount of wing span and area required for this low wing loading becomes prohibitive from weight and cost standpoints and, moreover, the airplane would be impractical for a speed range greater than about two because of the high accelerations that would be experienced in gusty air. Moreover, experience has shown that it is impossible to handle lightly wing-loaded airplanes (e. g. 5–7#/sq. ft.) on even moderately windy days.

Although the high-lift means of providing a steep glide path, low landing speed, and a short landing roll, are all old in the art, these factors alone are not sufficient to provide satisfactory performance for the small-field airplane. Unless the airplane can also take-off from the same area and over the same obstructions the advantages of a steep descent path and low landing speed are of no help in the utilization of small landing fields. In the case of the two leading Guggenheim Competition contenders previously mentioned, neither could do more than barely fly level with full power in the high-lift condition. The same was true of the McDonnell airplane as tested by the National Advisory Committee for Aeronautics (N. A. C. A. Tech. Note No. 398). Consequently the high-lift devices could not be used during take-off and therefore take-off performance was little if any better than that of an unflapped airplane.

The winner of the 1934 International Touring

Competition (Aircraft Engineering, October 1934, page 259), the Czechoslovakian RWD-9 airplane, had a maximum lift coefficient of 3.25 and a take-off performance sufficient to clear a 23 ft. barrier in 225 feet. Such take-off performance is satisfactory for the small-field airplane, but was obtained at the very considerable expense of a power loading (weight per horse-power) of 6.75 pounds per horse-power, about twice the power installed in a comparable civil airplane. Every horse-power installed in such an airplane weighs about two pounds and requires about 1.4 pounds of gasoline for a satisfactory endurance. Since about 0.4 pound of structure is required to carry each pound of power plant and gasoline, each additional horse-power installed costs 4.76 pounds of gross weight increase. The ratio of pay load to gross weight then becomes proportionally reduced, making the airplane unduly large and expensive in relation to its pay load. The operation costs are also increased substantially by the additional fuel cost, insurance, depreciation, and storage.

The fundamental reason for the requirement of increased thrust when flying at high-lift coefficients is that the induced drag increases as the square of the lift coefficient. Therefore, if the lift coefficient is doubled the induced drag coefficient is multiplied by four. To keep the induced drag coefficient constant, when the lift is doubled, the span would also have to be doubled for constant wing area. This would quadruple the wing aspect ratio, $$\text{Wing aspect ratio} = \frac{\text{span}}{\text{average chord}}$$

To have the same induced drag coefficient as a plain wing of 36 ft. span, the span would have to be increased to 72 feet, with the tail length increased in proportion. This would obviously be an impractical method of reducing the power required to overcome the induced drag. In addition to increasing the induced drag, slots and flaps also increase the profile drag, which no known alteration of the structure will reduce. Moreover, it is undesirable to attempt to reduce the drag at high-lift coefficients unless a separate lift and drag control can be provided since a high drag at high-lift coefficients is helpful during landing.

I have discovered that I can avoid the use of a large and heavy aircraft by a particular combination of engine, propeller, and wing dimensions in an airplane with high-lift devices and I have found that the high drag (both induced and profile) of my wing with its effective high-lift device can be overcome by properly relating the physical dimensions of the propeller with respect to said wing. This I have done by correlating propeller dimensions in relation to those of the wing so that $$K = \frac{\text{prop. dia.} \times \text{prop. area}}{\text{wing span} \times \text{wing area}} > .006$$

and with propeller diameter in feet related to engine power so that $$\frac{D^2}{\text{Brake horsepower}} > 0.5$$

This has proved to provide the desired results because fundamentally the propeller diameter is the diameter of the column of air accelerated to produce the thrust and because the span of the wing is the diameter of the column of air deflected downwardly to produce lift and it will be seen that the first formula includes the ratio of the propeller diameter to the wing span. In addition, the amount of rearward acceleration of air by the propeller depends on the blade area, and the downward deflection of the lift column depends on the wing area. These factors are related in the first formula which gives no indication of the amount of power required to produce the desired result, but this is controlled by the second formula which relates the required power to propeller diameter.

The present invention furnishes a practical solution for the conflicting considerations above set forth and embodies a novel combination in a single-propeller fixed-wing airplane which, with normal power loading, provides short take-off and steep climb, as well as satisfactory cruise, steep glide and slow landing characteristics, including short landing roll with the use of brakes. This practical solution moreover contemplates an airplane easily handled and controlled by an ordinary pilot.

Figure 3:
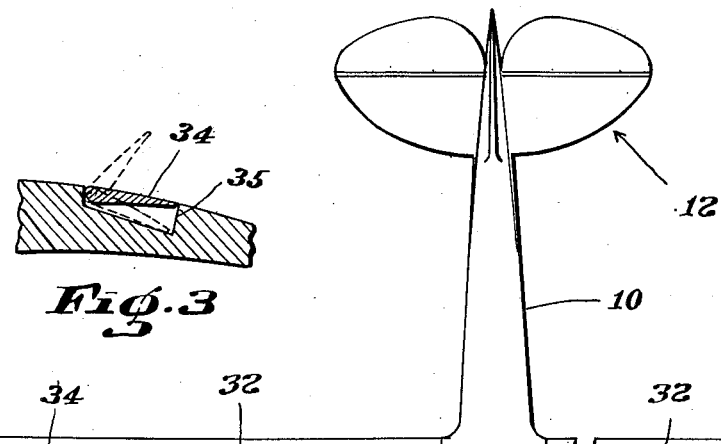
Fig. 3 is a cross-sectional elevation illustrating certain parts of the same.
Figure 2:
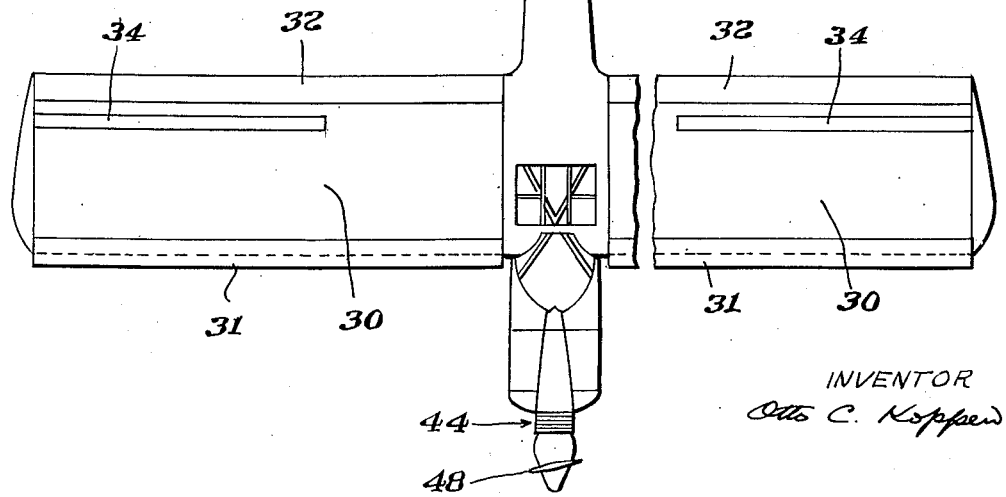
Fig. 2 is a top plan view of the same, partly broken away.

Referring to the illustrated airplane, the drawings show a modification of a present-day widely used civil airplane (known as a Piper J-3 Cub with a wing span of 35.3 ft. and wing area of 178.5 sq. ft.) having a conventional body 10 and empennage 12 consisting of vertical fin, rudder, stabilizer and elevator, as shown. The landing gear of usual type includes main wheels 14 supporting the airplane through hinged legs 16 and added shock struts 18, with tail wheel 20. The wing 30 attached to the body 10 includes left and right panels (as shown) modified to provide a slot between said wing and air-foil-shaped slat 31 mounted thereon. The entire trailing edge of said wing is equipped with flaps 32 mounted on the wing having suitable manually-actuated operating controls for each (not shown) so that the flaps may be depressed and held in the high-lift position indicated by dashed lines (Fig. 1) so as to provide a maximum lift coefficient preferably of at least 2.5 power-off, and as high as possible. Spoilers 34 having suitable manually-actuated operating controls (not shown) are preferred as rolling control, though ailerons may be used either alone or in conjunction with spoilers. Referring to Fig. 3, the spoilers 34 are arranged for differential travel below as well as above the upper surface of the wing resulting in a more natural "feel" to the controls, by providing a recess 35 into which the lowered spoiler may travel while the spoiler 34 on the opposite wing is in a raised position (as shown by dotted lines), in which it is effective as a rolling control. The slat 31 may be either fixed (as shown) or retractible, as well known in the art, and mounted on or in the wing at the leading edge thereof, all of these various forms, for simplicity, being herein referred to as "mounted on" said wing. The particular airplane illustrated has a wing loading of 7-8#/sq. ft., but the advantages of the invention may be had in airplanes of heavier wing loadings.

The preferred airplane shown is powered by a single typical flat multi-cylinder engine 40 driving a multi-groove V-belt pulley 42 which, through V-belts 44, drive a much larger V-belt pulley 46 (rotatably mounted on a counter shaft not shown) and attached to the single variable pitch propeller 48, thus "gearing down" the propeller as compared with the engine. Conventional reduction gearing may, of course, be employed in lieu of the V-belt reduction shown and described, and it is contemplated that either one or two engines may be geared to the single propeller.

Figure 1:
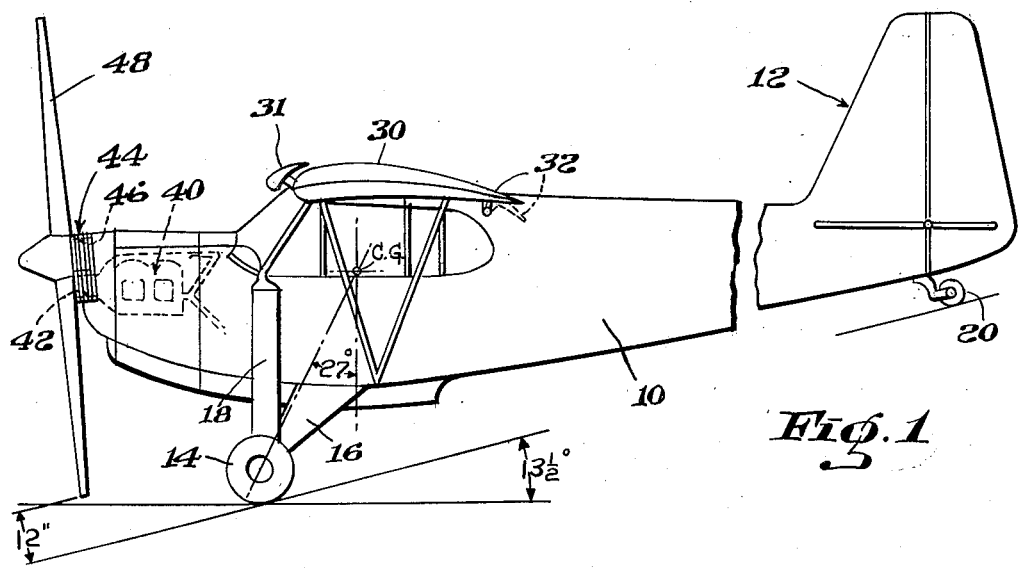
Fig. 1 is a side elevation illustrating an airplane of this invention.

It will be observed that the propeller as shown is very much larger than is conventional (the reasons for which will presently appear). Also, for satisfactory cruising speed said propeller should be of variable pitch (provided by usual operating mechanism, not shown) so as to afford steep pitch for cruising conditions and flat pitch for take-off and climbing conditions. The propeller is given sufficient ground clearance in the "three-point" ground attitude of the airplane (in the particular airplane as shown in Fig. 1 with 13½° angle of attack) by its elevated thrust line in which attitude it can be both taken off and landed. Thus, the ground clearance problem is not acute since this airplane of this invention can operate from the three-point attitude of a conventional landing gear (Fig. 1). It is a vital feature of the invention that there is provided sufficient thrust so that the airplane will be able to take off in still air at a distance of the same general order of length (e. g. 100 feet or thereabouts) as that of its braked landing roll, and also climb satisfactorily at an angle of attack at least at great as its "three-point" ground attitude. The preferred airplane of this invention has sufficient margin of thrust over drag to produce a 0.25 gravity acceleration at take-off air speed which will provide an angle of climb at said airspeed of approximately 15° in still air. The surprising results obtained are virtually independent of the slipstream effect as a practical matter, for example, the principles of my invention are equally applicable to a single-propeller pusher aircraft.

Heretofore, efforts to provide short take-off have involved abnormal power-loading (high-horsepower), much increased size of airplane, or both, as the result of failure to appreciate the importance and necessity of high thrust at low speed secured through large propeller disk area per horsepower as employed in accordance with this invention.

Propeller thrust per horsepower at any speed, V, (in accordance with NACA Wartime Report No. 3G26) can be expressed as:

$$\frac{T}{BHP} = \frac{K_t}{ND}$$

where
T is thrust,
BHP is brake horsepower,
$K_t$ is modified thrust coefficent
N is the propeller R. P. M., and
D is the propeller diameter in feet.

At first it might appear that this expression is contradictory to the conception that a high thrust per horsepower requires a large diameter, i. e., the diameter appears in the denominator and therefore if the ratio of $K_t/N$ were constant, the highest value of $$\frac{T}{BHP}$$

would be obtained with a minimum diameter. However, the ratio of $K_t/N$ is also dependent on the diameter and will have its maximum value when $K_t$ is a maximum and N is a minimum. Also, the relation between $K_t$ and the power coefficient is such that the maximum value of $K_t$ occurs at the minimum power coefficient, and, since the power coefficient varies inversely as $N^3D^5$, the maximum value of $$\frac{K_t}{ND}$$

will be obtained when the value of ND is a minimum and the propeller diameter is a maximum. Propeller static thrust is conventionally used as a measure of the power plant take-off performance, i. e., the higher the static thrust the greater the acceleration during the take-off run. In the particular airplane illustrated, the conventional direct-drive propeller diameter would be of the order of 6 feet and the engine maximum R. P. M. would be around 2800, whereas in accordance with the invention the airplane illustrated has a geared-down 10 ft. propeller operating at 1000 R. P. M. The static thrust for the smaller propeller for, say, a 100 H. P. engine, would be 410 pounds, and for the large propeller, 750 pounds, some 78% greater, giving the same static thrust effect as having 178 H. P. driving the smaller propeller. The increase in thrust is limited only by the maximum propeller diameter that can be swung on the airplane.

Particularly in regard to military aircraft, though also in civilian aircraft, it is advantageous to use a reduced propeller tip speed, not to exceed 700 ft./sec. and preferably as low as 550 ft./sec. With such tip speeds, the engine noise is predominant and mufflers may be used to good advantage. Thus a slow turning geared-down propeller must be used with the conventional light aircraft engine to achieve quiet operation.

In line with the foregoing, I have found that my novel airplane, satisfying the requirements above set forth, may be secured with present-day normal power loadings for take-off brake horsepower (10 lbs./H. P. or more, up to 14–18 lbs./H. P.) and a maximum wing lift coefficient for take-off and climb, as well as for approach and landing, preferably of at least 2.5 power-off, in which airplane $$\frac{\text{Propeller blade area} \times \text{propeller diameter}}{\text{Wing area} \times \text{wing span}}$$

is greater than 0.006, and preferably 0.0075, or more, and in which the ratio $$\frac{(\text{Propeller diameter})^2}{\text{Brake horsepower}}$$

is greater than 0.5, with propeller tip speeds not greater than 700 ft./sec., and preferably less than 550 ft./sec.

An example of the application of the two formulae to the specific airplane herein shown is here set forth, employing in the first formula the same figures for wing area and wing span as those for the standard J-3 Cub (equipped with the said high-lift devices, 100 H. P. engine, and geared-down 10 ft. propeller above referred to), the propeller blade area of 4.75 sq. ft. being an average conventional propeller blade area from published well-known standard data, and also employing the figures of said 10 ft. propeller and 100 H. P. engine in the second formula wherein, as well as in the appended claims, the expression "brake horsepower" is to be taken as meaning take-off brake horsepower since in an airplane brake horsepower is always figured as take-off brake horsepower, i. e. the maximum brake horsepower for which the engine is rated.

Substituting these figures in the first formula $$\frac{4.75 \times 10}{178.5 \times 35.3} = .00755$$

and in the second formula, $$\frac{(10)^2}{100} = 1.0 \text{ and } \therefore > 0.5$$

Thus, in my single-propeller small-field airplane with its high-thrust propeller high-lift wing and normal power loading, the high-lift of the wings is made available for the necessary short take-off and steep climb as well as for low-speed approach and low-speed landing. Naturally, the greatest utility of the invention is secured at the low end of the speed range and at high angles of attack which contributes to slow flight for both take-off and landing, particularly in the case of airplanes of low take-off and landing speeds of the order of 25–30 M. P. H. Very considerable advantages, however, may be had in airplanes having somewhat higher take-off and landing speeds, though the advantages are progressively less as said speeds are increased.

Having described the invention, I claim:

1. A single-propeller airplane of normal power loading for small-field use having, in combination, a body, a fixed wing, a high-lift device mounted on said wing, the wing and said device together providing a maximum lift coefficient for take-off and climb as well as approach and landing of at least 2.5 power-off, an engine, and a propeller connected to said engine, in which said airplane $$\frac{\text{Propeller blade area} \times \text{propeller diameter}}{\text{Wing area} \times \text{wing span}}$$

is greater than 0.006, $$\frac{(\text{Propeller diameter})^2}{\text{Brake horsepower}}$$

is greater than 0.5, and propeller tip speed is less than 700 ft./sec.

2. A single-propeller airplane of normal power loading for small-field use having, in combination, a body, a fixed wing, high-lift devices mounted on said wing including leading edge slats and trailing edge flaps, the wing and said device together providing a maximum lift coefficient for take-off and climb as well as approach and landing of at least 2.5 power-off, an engine, and a propeller connected to said engine, in which said airplane $$\frac{\text{Propeller blade area} \times \text{propeller diameter}}{\text{Wing area} \times \text{wing span}}$$

is greater than 0.006, $$\frac{(\text{Propeller diameter})^2}{\text{Brake horsepower}}$$

is greater than 0.5, and propeller tip speed is less than 700 ft./sec.

3. A single-propeller airplane of normal power loading for small-field use having, in combination, a body, a fixed wing, flaps on the trailing edge of said wing, the wing and said flaps together providing a maximum lift coefficient for take-off and climb as well as approach and landing of at least 2.5 power-off, an engine, and a propeller connected to said engine, in which said airplane $$\frac{\text{Propeller blade area} \times \text{propeller diameter}}{\text{Wing area} \times \text{wing span}}$$

is greater than 0.006, $$\frac{(\text{Propeller diameter})^2}{\text{Brake horsepower}}$$

is greater than 0.5, and propeller tip speed is less than 700 ft./sec.

4. A single-propeller airplane of normal power loading for small-field use having, in combination, a body, a fixed wing, a high-lift device mounted on said wing, the wing and said device together providing a maximum lift coefficient for take-off and climb as well as approach and landing of at least 2.5 power-off, an engine, and a propeller connected to said engine, in which said airplane $$\frac{\text{Propeller blade area} \times \text{propeller diameter}}{\text{Wing area} \times \text{wing span}}$$

is greater than 0.006, $$\frac{(\text{Propeller diameter})^2}{\text{Brake horsepower}}$$

is greater than 0.5.

5. A single-propeller airplane of normal power loading for small-field use having, in combination, a body, a fixed wing, a high-lift device including trailing edge flaps mounted on said wing, the said wing and said device together providing with said flaps depressed maximum lift coefficient for take-off and climb as well as approach and landing, an engine, and a geared-down propeller connected to said engine, in which said airplane $$\frac{\text{Propeller blade area} \times \text{propeller diameter}}{\text{Wing area} \times \text{wing span}}$$

is greater than 0.006, $$\frac{(\text{Propeller diameter})^2}{\text{Brake horsepower}}$$

is greater than 0.5.

6. A single-propeller airplane of normal power loading for small-field use having, in combination, a body, a fixed wing, high-lift devices including leading edge slats and trailing edge flaps mounted on said wing, the said wing and said devices together providing with said flaps depressed maximum lift coefficient for take-off and climb as well as approach and landing, an engine, and a geared-down propeller connected to said engine, in which said airplane $$\frac{\text{Propeller blade area} \times \text{propeller diameter}}{\text{Wing area} \times \text{wing span}}$$

is greater than 0.006, $$\frac{(\text{Propeller diameter})^2}{\text{Brake horsepower}}$$

is greater than 0.5.

OTTO C. KOPPEN.

REFERENCES CITED

The following references are of record in the file of this patent:

UNITED STATES PATENTS

| Number | Name | Date |
|---|---|---|
| 2,024,853 | Gaines | Dec. 17, 1935 |
| 2,322,745 | Rogallo | June 29, 1943 |

OTHER REFERENCES

"Aircraft Propeller Design" (Weick), McGraw-Hill, 1930, pp. 171, 266–273.